United States Patent
Chang et al.

(10) Patent No.: US 7,590,171 B2
(45) Date of Patent: Sep. 15, 2009

(54) APPARATUS AND METHOD FOR ESTIMATING A CARRIER-TO-INTERFERENCE-AND-NOISE RATIO IN A COMMUNICATION SYSTEM

(75) Inventors: Jae-Hwan Chang, Suwon-si (KR); In-Hyoung Kim, Seongnam-si (KR); Yun-Sang Park, Suwon-si (KR); Bong-Gee Song, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 700 days.

(21) Appl. No.: 11/260,822

(22) Filed: Oct. 27, 2005

(65) Prior Publication Data

US 2006/0093074 A1 May 4, 2006

(30) Foreign Application Priority Data

Oct. 28, 2004 (KR) .................. 10-2004-0086861

(51) Int. Cl.
*H04B 3/46* (2006.01)
*H04B 14/08* (2006.01)
*H04L 27/28* (2006.01)

(52) U.S. Cl. .................. 375/227; 375/260; 455/67.11

(58) Field of Classification Search .............. 375/227, 375/260, 346, 316; 455/63.1, 67.13, 226.3, 455/296
See application file for complete search history.

(56) References Cited

U.S. PATENT DOCUMENTS

| 6,456,653 | B1 | 9/2002 | Sayeed |
| 2003/0227866 | A1* | 12/2003 | Yamaguchi .......... 370/208 |
| 2005/0090293 | A1* | 4/2005 | Lin et al. ............ 455/67.13 |
| 2006/0262841 | A1* | 11/2006 | Vaisanen et al. ...... 375/227 |

FOREIGN PATENT DOCUMENTS

KR  20040008192  1/2004

* cited by examiner

*Primary Examiner*—Betsy L Deppe
(74) *Attorney, Agent, or Firm*—The Farrell Law Firm, LLP

(57) ABSTRACT

An apparatus and method are provided for estimating a Carrier-to-Interference-and-Noise Ratio (CINR) in a communication system based on Orthogonal Frequency Division Multiplexing (OFDM) or Orthogonal Frequency Division Multiple Access (OFDMA). In the communication system, all base stations boost a power level for a preamble or pilot by B dB. Accordingly, a received signal power level and a received interference level are boosted by B dB, but a noise level is not boosted. Transmission power for a preamble or pilot interval is boosted as compared with that for the data interval. After an interference and noise level is estimated from a preamble or pilot, the interference and noise level estimate of the preamble or pilot is corrected by taking into account a boosting level of the preamble or pilot.

18 Claims, 7 Drawing Sheets

APPARATUS AND METHOD FOR ESTIMATING A CARRIER-TO-INTERFERENCE-AND-NOISE RATIO IN A COMMUNICATION SYSTEM

PRIORITY

This application claims priority to an application entitled "Apparatus and Method for Estimating a Carrier-to-Interference-and-Noise Ratio in a Communication System", filed in the Korean Intellectual Property Office on Oct. 28, 2004 and assigned Serial No. 2004-86861, the entire contents of which are incorporated herein by reference.

BACKGROUND OF THE INVENTION

1. Field of the Invention

The present invention relates generally to a noise estimation apparatus and method, and more particularly to a Carrier-to-Interference-and-Noise Ratio (CINR) estimation apparatus and method for estimating a CINR serving as one of channel quality criteria in a communication system based on Orthogonal Frequency Division Multiplexing (OFDM) or Orthogonal Frequency Division Multiple Access (OFDMA).

2. Description of the Related Art

The Orthogonal Frequency Division Multiplexing (OFDM) technique has recently been used to transfer data at a high rate through a wired/wireless channel. The OFDM technique transfers data by means of a plurality of subcarriers. The OFDM technique converts input serial data into parallel data, modulates the parallel data into a plurality of subcarriers, that is, sub-channels, with orthogonality, and then transfers the modulated data.

This OFDM technique is widely applied to digital transfer technologies such as digital/audio broadcasting, digital TV, Wireless Local Area Network (WLAN), Wireless Asynchronous Transfer Mode (WATM), Broadband Wireless Access (BWA), etc. In the past, the OFDM technique was not widely used because of the hardware complexity required for implementing it, but has been employed recently due to the development of various digital signal processing technologies including Fast Fourier Transform (FFT) and Inverse Fast Fourier Transform (IFFT). This OFDM technique is similar to a conventional Frequency Division Multiplexing (FDM) technique, but above all can achieve optimal transfer efficiency by transferring a plurality of subcarriers while maintaining the orthogonality therebetween. Moreover, the OFDM technique improves frequency efficiency and is robust to multipath fading.

Further, the OFDM technique is robust to frequency-selective fading by utilizing overlapping frequency spectra and can reduce the effect of intersymbol interference by making use of guard intervals. In terms of hardware, the OFDM technique can employ a simple equalizer and is robust to impulse noise.

In a communication system based on OFDM/OFDMA, channel signal quality serving as a parameter necessary for Adaptive Power Control (APC), adaptive modulation/demodulation, etc., for example, a Carrier-to-Interference-Noise Ratio (CINR), must be measured. An APC or adaptive modulation/demodulation unit controls power or a modulation/demodulation level according to the measured channel signal quality using a CINR. In this case, the CINR is defined by the total sum of subcarrier signal power divided by the total sum of noise and interference power, and serves as a criterion determining channel quality in the communication system.

The prior art for estimating the CINR is disclosed in U.S. Pat. No. 6,456,653 (hereinafter, referred to as the "'653 patent") entitled "FAST AND ACCURATE SIGNAL-TO-NOISE RATIO ESTIMATION TECHNIQUE FOR OFDM SYSTEMS". In the '653 patent, a method for estimating a noise level using a guard band is disclosed. However, the above-described conventional noise level estimation method has a problem in that the accuracy of estimating the noise level may be degraded when the number of subcarriers is insufficient, and an estimated noise level may be higher than an actually measured noise level because of an Adjacent Channel Leakage Ratio (ACLR).

SUMMARY OF THE INVENTION

Accordingly, the present invention has been designed to solve the above and other problems occurring in the prior art. Therefore, it is an aspect of the present invention to provide an apparatus and method that estimate a more accurate Carrier-to-Interference-and-Noise Ratio (CINR) in an Orthogonal Frequency Division Multiplexing (OFDM) system.

The above and other aspects of the present invention can be achieved by an apparatus for estimating a Carrier-to-Interference-and-Noise Ratio (CINR) in a communication system. The apparatus includes a signal power estimator for estimating total received signal power; an interference and noise power estimator for estimating interference and noise power of a received signal; a noise level estimator for estimating a noise level of the received signal; and a CINR calculator for estimating a CINR in a data interval using outputs of the signal power estimator, the interference and noise power estimator, and the noise level estimator.

BRIEF DESCRIPTION OF THE DRAWINGS

The above and other aspects and advantages of the present invention will be more clearly understood from the following detailed description taken in conjunction with the accompanying drawings, in which.

DETAILED DESCRIPTION OF THE PREFERRED EMBODIMENTS

Preferred embodiments of the present invention will be described in detail herein below with reference to the accompanying drawings. In the following description, a detailed description of known functions and configurations incorporated herein will be omitted for conciseness.

Figure 1:
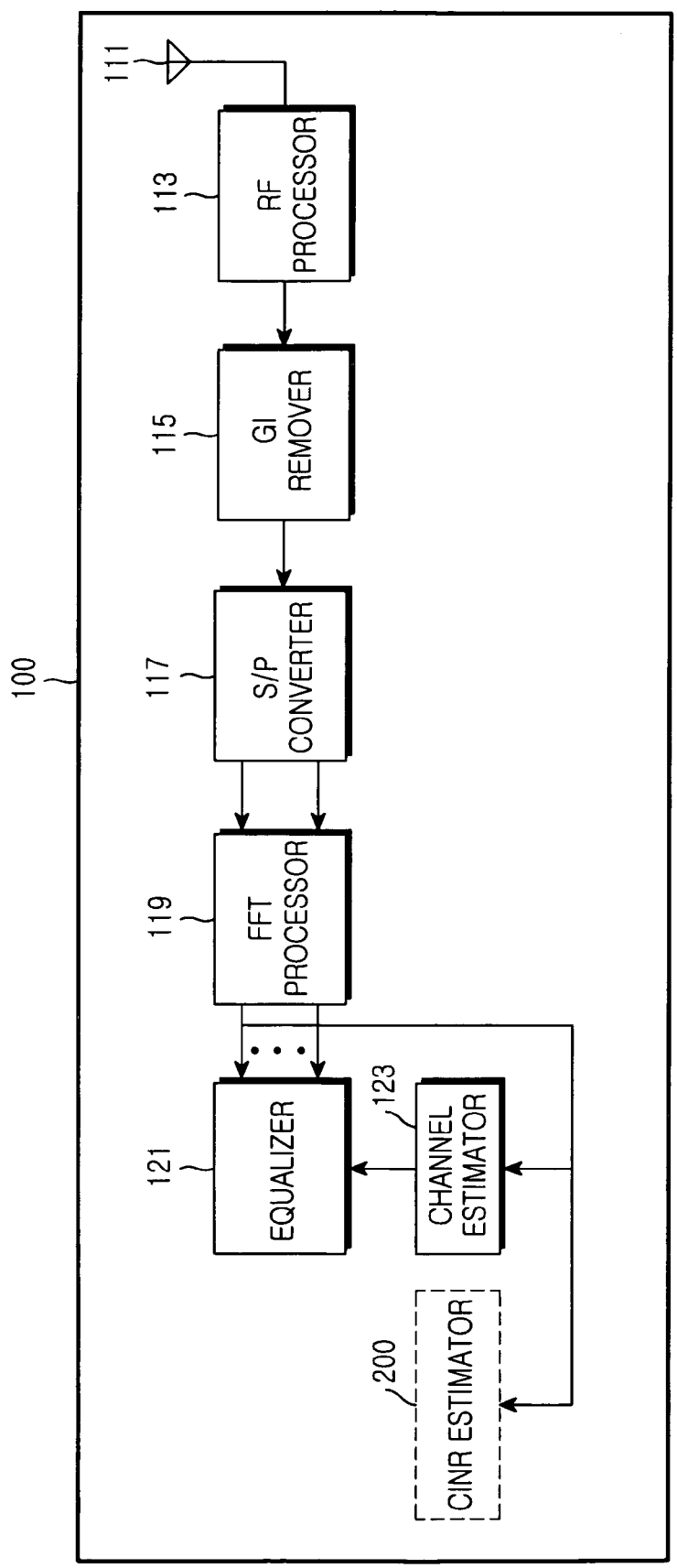
FIG. 1 is a block diagram illustrating an Orthogonal Frequency Division Multiplexing (OFDM) receiver with a Carrier-to-Interference-and-Noise Ratio (CINR) estimator in accordance with an embodiment of the present invention.

FIG. 1 is a block diagram illustrating an Orthogonal Frequency Division Multiplexing (OFDM) receiver with a Carrier-to-Interference-and-Noise Ratio (CINR) estimator in accordance with an embodiment of the present invention. Referring to FIG. 1, an OFDM receiver 100 includes an antenna 111, a Radio Frequency (RF) processor 113, a Guard Interval (GI) remover 115, a Serial-to-Parallel (S/P) converter 117, a Fast Fourier Transform (FFT) processor 119, an equalizer 121, a channel estimator 123, and a CINR estimator 200.

The RF processor 113 outputs channel data received through the antenna 111 to the GI remover 115. The GI remover 115 removes a GI from the received channel data. The S/P converter 117 converts, into a plurality of pieces of parallel data, serial channel data from which the GI has been removed, and then outputs the parallel data to the FFT processor 119. The FFT processor 119 performs an FFT operation on the parallel channel data from which the GI has been removed, and then outputs channel data corresponding to a result of the FFT operation to the equalizer 121. The equalizer 121 removes signal distortion that has occurred in a communication channel environment from the channel data of the FFT operation result, and then outputs data from which the signal distortion has been removed.

The channel estimator 123 estimates a channel state according to phase and amplitude skew in a frequency domain caused by channel degradation when a transmission and reception function is performed, and then compensates for the phase and amplitude skew in the frequency domain. The CINR estimator 200 estimates channel quality, that is, a CINR.

In the OFDM system described above, an OFDM transmitter performs an inverse FFT (IFFT) operation on modulated signals, inserts a GI into the signals, and transmits the signals into which the GI has been inserted. Conversely, the OFDM receiver removes the GI from received signals, performs the FFF operation on the received signals from which the GI has been removed, demodulates a result of the FFT operation, and recovers an original signal.

The OFDM transmitter sends digital signals with an already known pattern such as pilot or preamble signals. The OFDM receiver estimates a CINR using received signals. In this case, the present invention takes into account a boosting level of the pilot or preamble signals. More specifically, when transmitting a preamble or pilot, a base station boosts transmission power in a preamble or pilot interval by a value of B dB as compared with that in a data interval.

In actuality, CINR values are different in the preamble or pilot interval and the data interval. In this case, a boosting value is defined according to a standard. A boosting value for the preamble interval is conventionally different from that for the pilot interval. If a power level is boosted in the data interval, the boosting value of B dB used for the present invention is analyzed as a boosting level for the preamble or pilot interval relative to a boosting level for the data interval.

When a CINR value in the data interval to be estimated is denoted by $CINR_d$, it can be written as shown in Equation (1).

$$CINR_d = \frac{C_d}{I_d + N_d} \quad (1)$$

In this case, when a CINR value in the preamble interval is denoted by $CINR_p$, it can be written as shown in Equation (2).

$$CINR_p = \frac{C_p}{I_p + N_p} \quad (2)$$

In Equations (1) and (2), $C_d$ and $C_p$ denote received true signal power levels, $I_d$ and $I_p$ denote received interference levels, and $N_d$ and $N_p$ denote noise levels. A value with a subscript "d" is a level value in the data interval, and a value with a subscript "p" is a level value in the preamble interval. Two level values between the data and preamble intervals, rather than the noise levels, are conventionally different from each other. All base stations boost a power level for a preamble by B dB. Accordingly, a received signal power level and a received interference level are boosted by B dB, but a noise level is not boosted. The level values can be written as shown in Equation (3).

$$C_p = 10^{0.1B} C_d$$

$$I_p = 10^{0.1B} I_d$$

$$N_p = N_d \quad (3)$$

The boosting level value B is defined by a standard in the above Equation (3).

It can be seen from Equations (1), (2), and (3) that the CINR value in the preamble or pilot interval is different from that of the data interval.

When a boosting level for transmission power in the preamble or pilot interval is higher than that for transmission power in the data interval in the OFDM or OFDMA-based communication system, a CINR estimate in the preamble or pilot interval is different from that in the data interval. In accordance with an embodiment of the present invention, an interference and noise level estimate of the preamble or pilot is corrected by taking into account a boosting level of a preamble or pilot after an interference and noise level is estimated from the preamble or pilot.

In more detail, an embodiment of the present invention corrects the CINR value of the preamble or pilot by taking into account boosted transmission power of the preamble or pilot such that the CINR value in the data interval is computed. Accordingly, when $C_d$, $I_d$, and $N_d$ of Equation (1) for computing the CINR in the data interval is replaced with $C_d$, $I_d$, and $N_d$ expressed by $C_p$, $I_p$ and $N_p$ in the above Equation (3), Equation (4) is obtained.

$$CINR_d = \frac{C_p/10^{0.1B}}{I_p/10^{0.1B} + N_p} = \frac{C_p}{I_p + 10^{0.1B}/N_p} = \frac{C_p}{I_p + N_p + (10^{0.1B} - 1)N_p} \quad (4)$$

As seen in Equation (4), the CINR in the data interval can be obtained by computing $C_p$, $I_p$, and $N_p$. Here, $C_p$ denotes a received true signal power level in the preamble or pilot signal interval, $I_p$ denotes a received interference level in the preamble or pilot signal interval, and $N_p$ denotes a noise level in the preamble or pilot signal interval. The received true signal power level can be obtained by subtracting, from the received signal power level, the interference and noise level of the preamble or pilot signal corrected by a boosting value included in the denominator of Equation (4). The corrected interference and noise level of the preamble or pilot signal is expressed as shown Equation (5).

$$I_p + N_p + (10^{0.1B} - 1)N_p \quad (5)$$

As described above, the present invention computes the CINR in the data interval using a power level of a received true signal in the preamble or pilot interval, a received interference level, and a noise level. The CINR estimator implemented in accordance with the present invention will be described.

Figure 2:
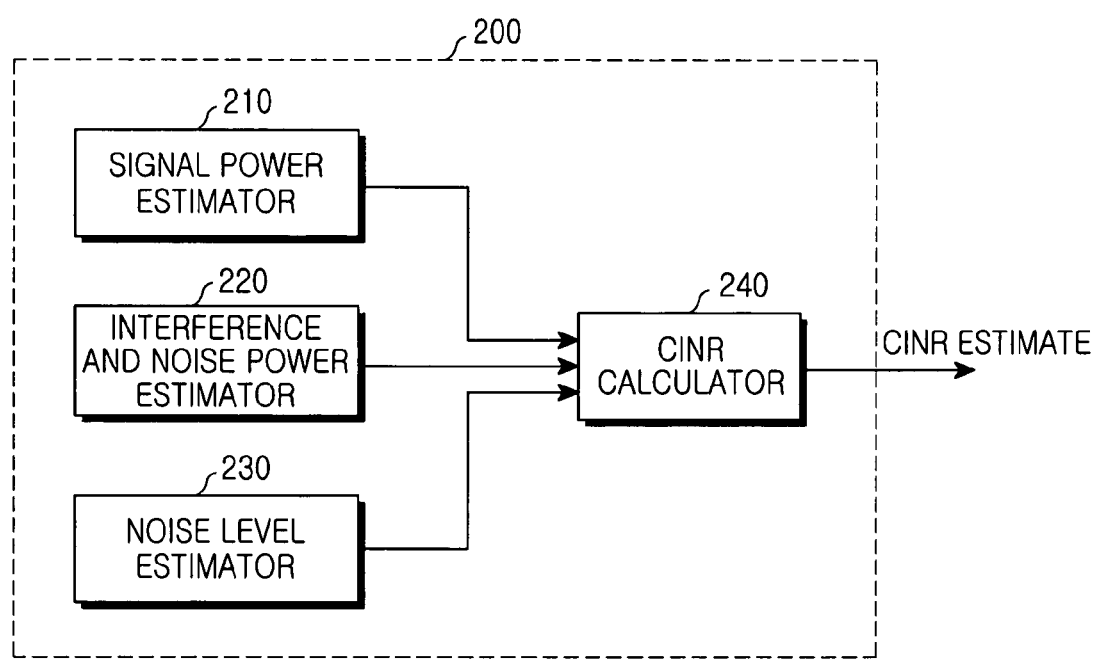
FIG. 2 is a block diagram illustrating the CINR estimator in accordance with an embodiment of the present invention.

FIG. 2 is a block diagram illustrating the CINR estimator 200 in accordance with an embodiment of the present invention. Referring to FIG. 2, the CINR estimator 200 includes a signal power estimator 210 for estimating total received signal power, an interference and noise power estimator 220 for estimating interference and noise power of the received preamble or pilot signal, a noise level estimator 230 for estimating a noise level of a received signal, and a CINR calculator 240 for estimating a CINR in the data interval.

The CINR estimator 200 provides subcarriers of the signal received from the FFT processor 119 illustrated in FIG. 1 to the signal power estimator 210, the interference and noise power estimator 220, and the noise level estimator 230. The signal power estimator 210 estimates the received signal power. More specifically, the signal power estimator 210 computes power of each subcarrier from the signal received from the FFT processor 119, computes a sum of subcarrier power values to estimate the signal power, and outputs estimated signal power information to the CINR calculator 240.

The interference and noise power estimator 220 estimates noise power of the received signal to output estimated noise power information to the CINR calculator 240 and estimates the power of noise included in the received signal using the fact that each subcarrier of the received signals has channel characteristics similar to those of an adjacent subcarrier.

The noise level estimator 230 estimates the noise level of the received signal. To estimate the noise level, the noise level estimator 230 estimates the noise level using some subcarriers, not including a signal to be transmitted. In the OFDM communication system to which the present invention is applied, a preamble structure in which a time domain pattern for synchronization is repeated is designed, such that some subcarriers only transmit a signal.

For example, when it is designed that a repeat pattern in the time domain is formed one time, odd subcarriers do not include a signal to be transmitted, and only even subcarriers include a pilot signal to be transmitted. In this case, the odd subcarriers include only noise. If an FFT size is sufficiently large, the total noise power of the odd subcarriers can be determined as a half value of a level of noise included in all used subcarriers, because noise of the odd and even subcarriers follows a normal distribution with the same standard deviation. That is, the noise level estimator 230 in accordance with the embodiment of the present invention estimates a noise level using the signal power of some subcarriers not including a signal to be transmitted and then provides estimated noise level information to the CINR calculator 240.

Alternatively, the noise level estimator 230 in accordance with another embodiment of the present invention can use the technique disclosed in U.S. Pat. No. 6,456,653 entitled "FAST AND ACCURATE SIGNAL-TO-NOISE RATIO ESTIMATION TECHNIQUE FOR OFDM SYSTEMS".

The CINR calculator 240 receives the power information of a total received signal from the signal power estimator 210, receives the interference and noise power information from the interference and noise power estimator 220, and receives the noise level information from the noise level estimator 230. Subsequently, the CINR calculator 240 estimates the CINR in the data interval using the signal power information, the interference and noise power information, and the noise level information associated with the total received signal. In this case, the CINR calculator 240 corrects the noise level in the preamble or pilot interval by taking into account the B value, which indicates the boosting level when the transmission power in the preamble or pilot interval is boosted as compared with that in the data interval. Because the boosting level value B is defined by the standard, it is not necessary to be additionally computed or measured.

Figure 3:
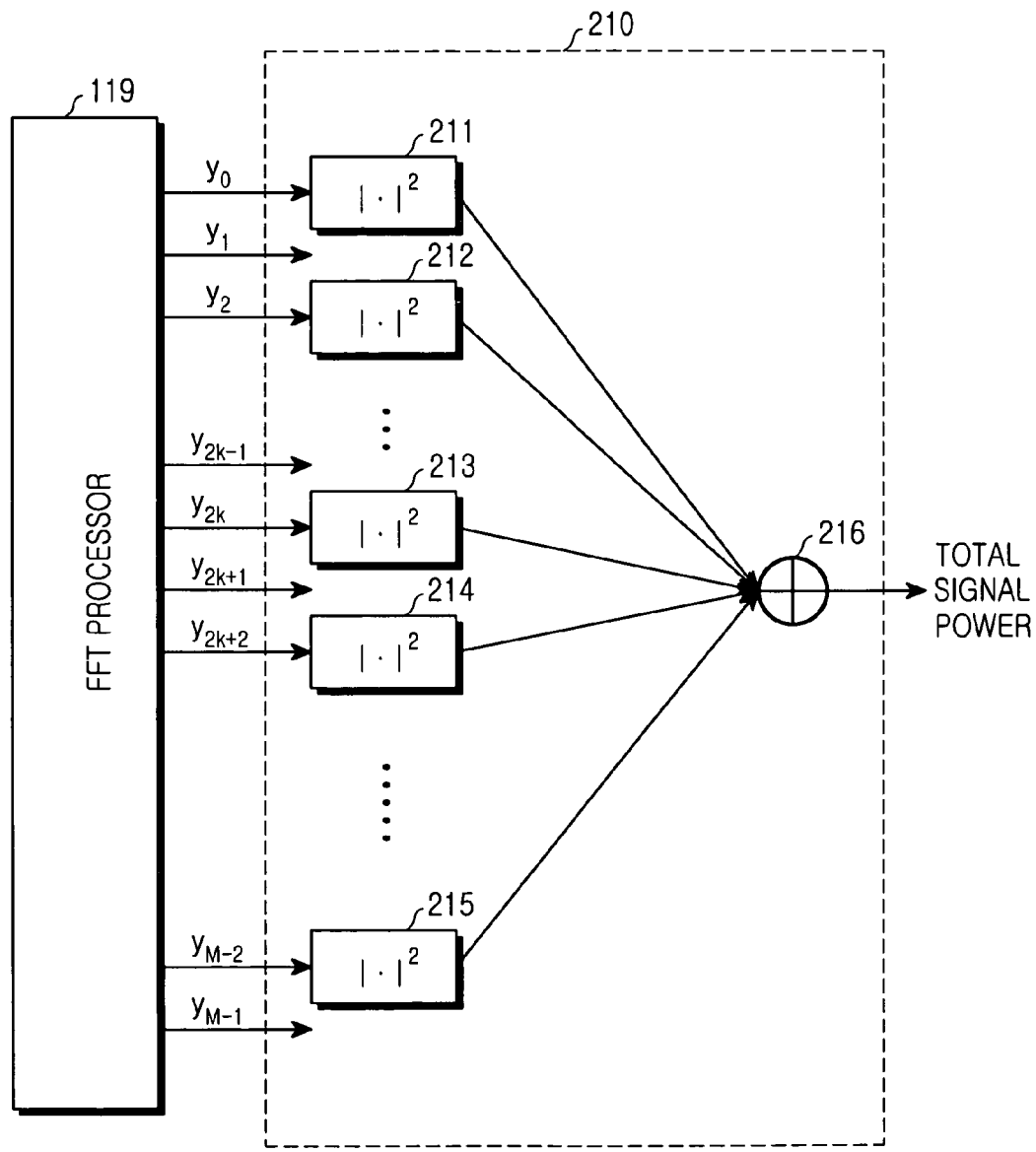
FIG. 3 is a block diagram illustrating a signal power estimator in accordance with an embodiment of the present invention.

FIG. 3 is a block diagram illustrating the signal power estimator 210 in accordance with an embodiment of the present invention. Referring to FIG. 3, the signal power estimator 210 computes power of each subcarrier provided from the FFT processor 119 of FIG. 1. The signal power estimator 210 includes a plurality of power detectors 211 to 215 for receiving a plurality of subcarriers from the FFT processor 119 and detecting power values of the subcarriers. The signal power estimator 210 further includes an adder 216 for computing a sum of signal power values provided from the power detectors 211 to 215. The adder 216 sums the signal power values output from the power detectors 211 to 215 and outputs the total received signal power.

Figure 4:
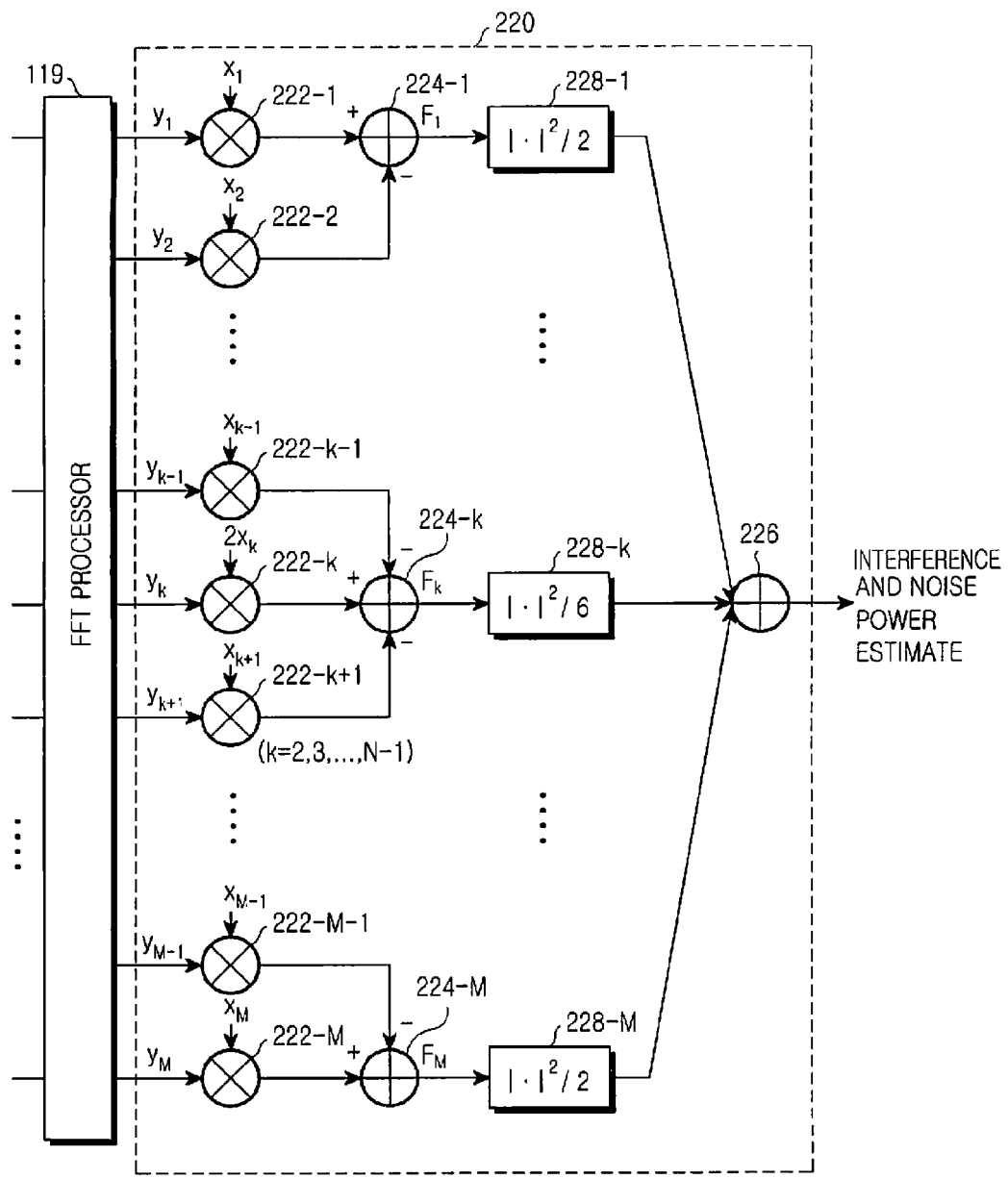
FIG. 4 is a block diagram illustrating an interference and noise power estimator in accordance with an embodiment of the present invention.

FIG. 4 is a block diagram illustrating the interference and noise power estimator 220 in accordance with an embodiment of the present invention. Referring to FIG. 4, the interference and noise power estimator 220 includes a plurality of correlators 222-1 to 222-M, a plurality of computational operators 224-1 to 224-M, a plurality of power detectors 228-1 to 228-M, and an adder 226. The correlators 222-1 to 222-M correlate a pilot sequence preset in a plurality of subcarriers of the received signal element by element, and compute correlation values for the subcarriers. Subsequently, the computational operators 224-1 to 224-M compute a difference between a correlation value for each subcarrier and a correlation value for at least one adjacent subcarrier, respectively. In this case, the number of adjacent subcarriers with similar channel characteristics can be arbitrarily defined. Because adjacent subcarriers have the almost same channel characteristics, a difference between the correlation values is a value of interference and noise components from which signal components are cancelled out. The plurality of power detectors 228-1 to 228-M receive the outputs of the plurality of computational operators 224-1 to 224-M, and detect and average power values of the subcarriers. The adder 226 sums interference and noise components from the computational operators 224-1 to 224-M, and then computes the total interference and noise power.

Figure 5:
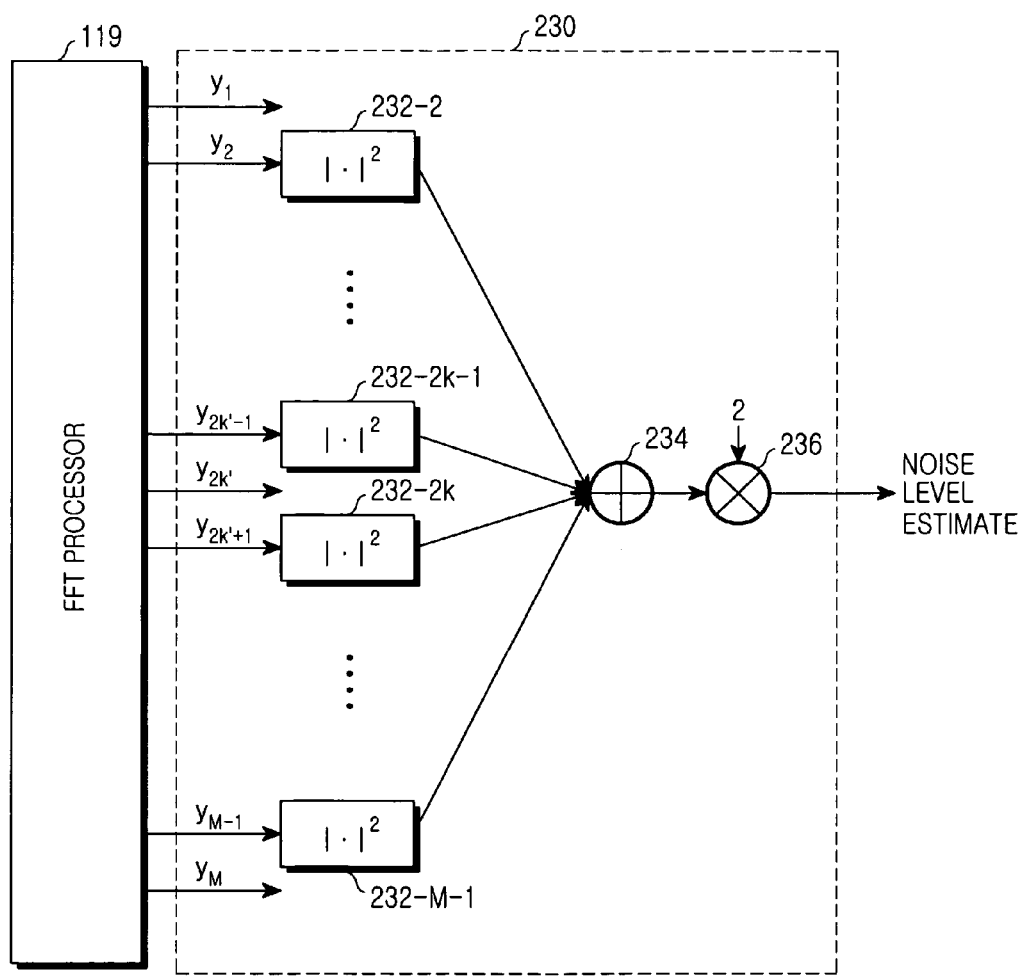
FIG. 5 is a block diagram illustrating a noise level estimator in accordance with an embodiment of the present invention.

FIG. 5 is a block diagram illustrating the noise level estimator 230 in accordance with an embodiment of the present invention. Referring to FIG. 5, the noise level estimator 230 includes a plurality of noise power detectors 232-2 to 232-M-1, an adder 234, and a multiplier 236.

As described above, a preamble structure in which a time domain pattern for synchronization is repeated is designed in the OFDM communication system to which the present invention is applied, such that some subcarriers only transmit a signal. For example, when it is designed that a repeat pattern in the time domain is formed one time, odd subcarriers do not include a signal to be transmitted, and only even subcarriers include a pilot signal to be transmitted. When it is designed that a time domain pattern is repeated two times, pilot signals are assigned every three subcarriers. A subcarrier not including a signal to be transmitted includes only noise.

The noise level estimator 230 in accordance with the embodiment of the present invention sums noise power levels of some subcarriers, not including a signal to be transmitted. The noise power detectors 232-2 to 232-M−1 are configured correspondingly to some subcarriers not including a signal to be transmitted among all the subcarriers received by the noise level estimator 230. The noise power detectors 232-2 to 232-M-1 receive some subcarriers, not including a signal to be transmitted, compute power values of the received subcarriers, and provide the power values of the received subcarriers to the adder 234.

The adder 234 sums the power values provided from the noise power detectors 232-2 to 232-M-1, and provides a result of the summation to the multiplier 236. In this embodiment, because the communication system is designed that a repeat pattern in the time domain is formed one time, odd subcarriers do not include a signal to be transmitted, and only even subcarriers include a pilot signal to be transmitted. In this case, the odd subcarriers include only noise. A total noise power computed by the adder 234 can be determined as a half value of a level of noise included in all the used subcarriers because noise of the odd and even subcarriers follows a normal distribution with the same standard deviation.

Because the computed noise power level is the half value of the level of noise included in all the used subcarriers, the noise power of all the subcarriers must be twice the noise power level output from the adder 234. Accordingly, the multiplier 236 is provided. The multiplier 236 computes the total noise power level by multiplying the noise power value output from the adder 234 by two. The multiplier 236 sets the output of the adder 234 to the total noise power. Those skilled in the art will appreciate that the configuration of the communication system can be different according to the number of subcarriers for transmitting a signal.

The noise level estimator 230 in accordance with the embodiment of the present invention estimates a noise level using power values of the subcarriers not including a signal to be transmitted, and provides estimated noise level information to the CINR calculator 240.

If preambles are assigned every x number of subcarriers, another embodiment of the present invention is able to use a noise power level estimate for the subcarriers including a signal to be transmitted when summing noise power levels of the subcarriers not including a signal to be transmitted and dividing a sum of the noise power levels by (x−1). Here, x is 2, 3, 4, or etc., and must be a smaller value than the FFT size.

When a CINR in the data interval is estimated using a pilot in the pilot interval, the noise level estimate associated with the preamble can be used.

Figure 6:
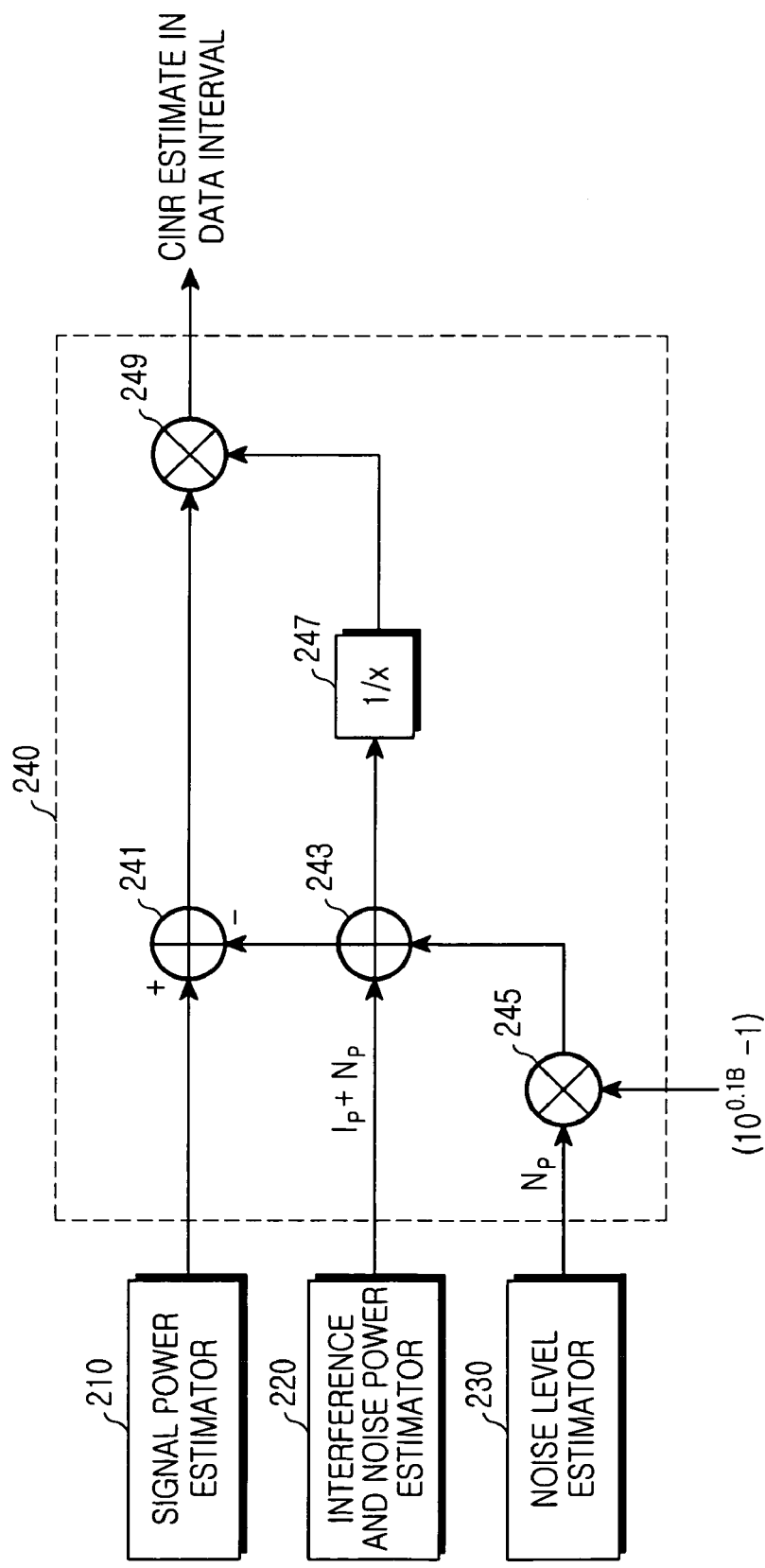
FIG. 6 illustrates details of a CINR calculator of the CINR estimator in accordance with an embodiment of the present invention.

FIG. 6 illustrates details of the CINR calculator 240 of the CINR estimator 200 in accordance with an embodiment of the present invention. As illustrated in FIG. 6, the CINR calculator 240 is according to Equation (4). As shown in Equation (4), the CINR in the data interval can be obtained by computing $C_p$, $I_p$, and $N_p$ in the preamble or pilot signal interval. As described above, $C_p$ denotes a received true signal power level in the preamble or pilot signal interval, $I_p$ denotes a received interference level in the preamble or pilot signal interval, and $N_p$ denotes a noise level in the preamble or pilot signal interval.

In Equation (4), a value of $I_p+N_p$ of the denominator can be computed using the interference and noise power estimator 220. The boosting level value B is defined by the standard, and is not necessary to be additionally computed or measured. The noise level $N_p$ can be computed using the noise level estimator 230. The received true signal power level $C_p$ can be computed from the total received signal power and the interference and noise power. That is, the received true signal power level $C_p$ can be obtained by subtracting the interference and noise power from the total received signal power. Accordingly, the CINR calculator 240 in accordance with the embodiment of the present invention obtains the true signal power by subtracting a value of the interference and noise power output by the interference and noise level power estimator 220 from a value of the total signal power output by the signal power estimator 210.

Referring to FIG. 6, a first multiplier 245 of the CINR calculator 240 multiplies the noise power level from the noise level estimator 230 by $(10^{0.1B}-1)$ to produce a value of $(10^{0.1B}-1)N_p$, such that the denominator value of Equation (4) is computed. The first multiplier 245 provides the produced value of $(10^{0.1B}-1)N_p$ to a first computational operator 243. The first computational operator 243 adds the interference and noise power $I_p+N_p$ output by the interference and noise power estimator 220 to the value of $(10^{0.1B}-1)N_p$ output by the first multiplier 245, and then outputs a result of the addition to a reciprocal generator 247. The reciprocal generator 247 generates a reciprocal of $I_p+N_p+(10^{0.1B}-1)N_p$ output by the first computation operator 243, and provides the generated reciprocal to a second multiplier 249.

A second computational operator 241 subtracts the interference and noise power value output by the interference and noise power estimator 220 from the total received signal power value output by the signal power estimator 210 such that the numerator of Equation (4), that is, the true signal power in the preamble or pilot signal interval, can be computed. The second computation operator 241 outputs a result of the subtraction to the second multiplier 249. The second multiplier 249 multiplies the reciprocal of $I_p+N_p+(10^{0.1B}-1)N_p$ generated from the reciprocal generator 247 by the true received signal power value received from the second computational operator 241, thereby computing the CINR in the data interval.

As described above, the CINR estimator 200 in accordance with the embodiment of the present invention computes the CINR in the data interval from the received true signal power level, the interference and noise power level, and the noise level in the preamble or pilot signal interval.

Figure 7:
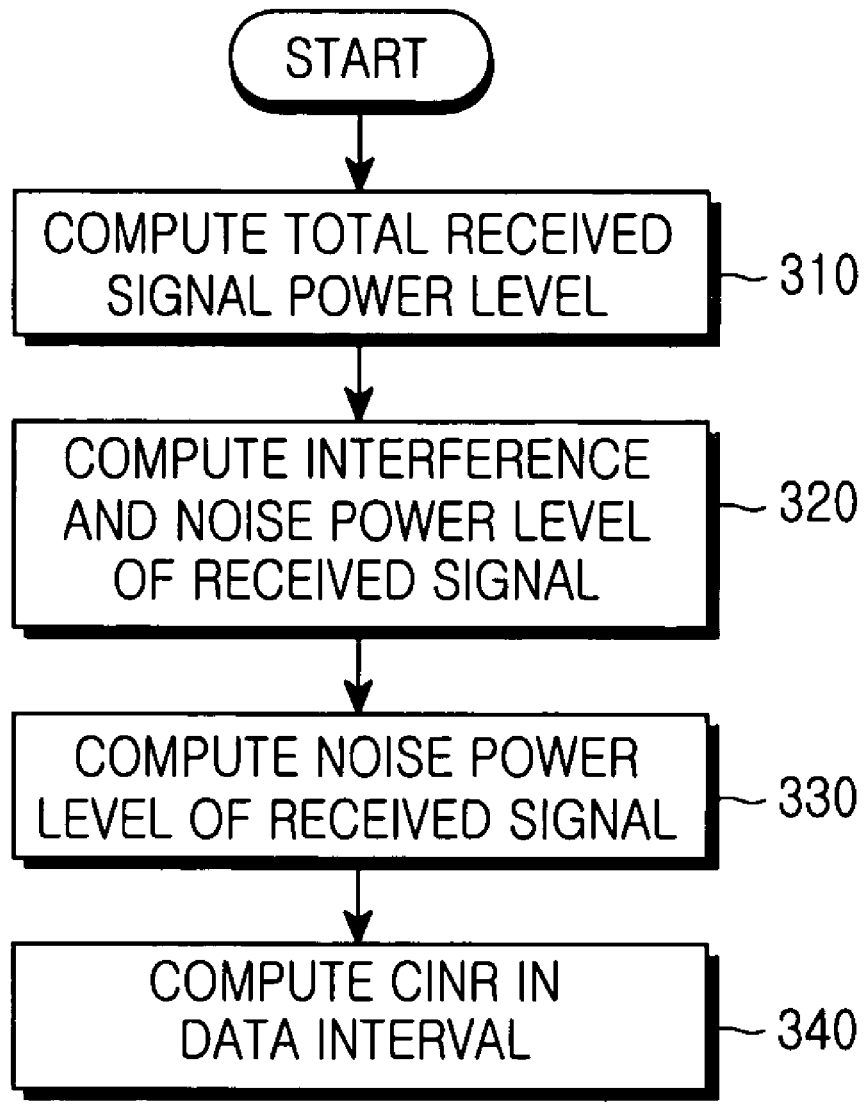
FIG. 7 is a flow chart illustrating operation of the CINR estimator in accordance with an embodiment of the present invention.

FIG. 7 is a flow chart illustrating operation of the CINR estimator 200 in accordance with an embodiment of the present invention. Referring to FIG. 7, the signal power estimator 210 of the CINR estimator 200 estimates power of the total received signal in step 310. More specifically, the signal power estimator 210 computes a power value of each subcarrier received from the FFT processor 119, and sums power values of respective subcarriers, thereby estimating the total signal power.

Subsequently, the interference and noise power estimator 220 estimates interference and noise power of the received signal in step 320. At this time, the interference and noise power of the received signal can be estimated using similar channel characteristics between adjacent subcarriers of the received signal. Subsequently, the noise level estimator 230 estimates the noise power level of the received signal in step 330. As described above, the noise level estimator 230 in accordance with the embodiment of the present invention can estimate the noise power level using some subcarriers not including a signal to be transmitted.

Subsequently, the CINR calculator 240 obtains the true signal power by subtracting a value of the interference and noise power output by the interference and noise level power estimator 220 from a value of the total signal power output by the signal power estimator 210 in step 340. As described above, the CINR calculator 240 corrects the noise level in the preamble or pilot interval by taking into account the B value indicating the boosting level when the transmission power in the preamble or pilot interval is boosted as compared with that in the data interval.

In accordance with the present invention, a CINR serving as a parameter necessary for Adaptive Power Control (APC) or Adaptive Modulation and Coding (AMC) can be accurately estimated.

Although the preferred embodiments of the present invention have been disclosed for illustrative purposes, those skilled in the art will appreciate that various modifications, additions, and substitutions are possible, without departing from the scope of the present invention. The present invention can be applied to not only an Orthogonal Frequency Division Multiplexing (OFDM) system, but also to an Orthogonal Frequency Division Multiple Access (OFDMA) system and Discrete Multitone Technology (DMT).

Therefore, the present invention is not limited to the above-described embodiments, but is defined by the following claims, along with their full scope of equivalents.

What is claimed is:

1. An apparatus for estimating a Carrier-to-Interference-and-Noise Ratio (CINR) in a communication system, comprising:
    a signal power estimator for estimating a total received signal power;
    an interference and noise power estimator for estimating an interference and noise power of a received signal;
    a noise level estimator for estimating a noise level of the received signal; and
    a CINR calculator for estimating a CINR in a data interval using outputs of the signal power estimator, the interference and noise power estimator, and the noise level estimator.

2. The apparatus according to claim 1, wherein the CINR calculator takes into account a B value that indicates a boosting level when a transmission power for one of a preamble signal interval and a pilot signal interval is boosted as compared with that for the data interval.

3. The apparatus according to claim 1, wherein the signal power estimator comprises:
    a plurality of power detectors for receiving a plurality of subcarriers and detecting power values of the subcarriers; and
    an adder for summing the power values provided from the plurality of power detectors and outputting the total received signal power.

4. The apparatus according to claim 1, wherein the interference and noise power estimator comprises:
    a plurality of correlators for correlating a reference sequence preset in a plurality of subcarriers of the received signal, and outputting correlation values for the subcarriers;
    a plurality of computational operators each computing a difference between a correlation value for each subcarrier and a correlation value for at least one adjacent subcarrier; and
    an adder for summing differences between correlation values for the subcarriers from the computational operators and computing a total interference and noise power.

5. The apparatus according to claim 1, wherein the noise level estimator estimates a total noise level using power values of subcarrier signals from among all subcarrier signals in the received signal, and each of the subcarrier signals does not include a pilot signal.

6. The apparatus according to claim 5, wherein the CINR calculator computes the CINR using:

$$CINR_d = \frac{C_p/10^{0.1B}}{I_p/10^{0.1B} + N_p} = \frac{C_p}{I_p + 10^{0.1B}/N_p} = \frac{C_p}{I_p + N_p + (10^{0.1B} - 1)N_p},$$

where $C_P$ denotes a received true signal power level in one of a preamble and a pilot signal interval, $I_P$ denotes a received interference level in the preamble or pilot signal interval, and $N_P$ denotes a noise level in one of the preamble and the pilot signal interval.

7. The apparatus according to claim 1, wherein the noise level estimator comprises;
    a plurality of noise power detectors for computing power values of subcarrier signals among all subcarrier signals in the received signal, and each of the subcarrier signals does not include a pilot signal;
    an adder for summing outputs of the plurality of noise power detectors; and
    a multiplier for computing a total subcarrier noise level using an output of the adder.

8. The apparatus according to claim 1, wherein the CINR calculator computes a true signal power by subtracting a value of the interference and noise power output by the interference and noise power estimator from a value of the total received signal power output by the signal power estimator.

9. The apparatus according to claim 1, wherein the CINR calculator estimates the CINR by taking into account a boosting level of one of a preamble signal and a pilot signal.

10. A method for estimating a Carrier-to-Interference-and-Noise Ratio (CINR) in a communication system, comprising:
    estimating in a signal power estimator a total received signal power;
    estimating in an interference and noise power estimator an interference and noise power of a received signal;
    estimating in a noise level estimator a noise level of the received signal; and
    estimating in a CINR calculator a CINR in a data interval using the total received signal power, the interference and noise power, and the noise level.

11. The method according to claim 10, wherein the step of estimating the CINR takes into account a B value that indicates a boosting level when a transmission power for one of a preamble signal interval and a pilot signal interval is boosted as compared with that for the data interval.

12. The method according to claim 10, wherein the step of estimating the total received signal power comprises:
    receiving a plurality of subcarriers and detecting power values of the plurality of subcarriers;
    summing the power values; and
    outputting the total received signal power.

13. The method according to claim 10, wherein the step of estimating the interference and noise power comprises:
    correlating a reference sequence preset in a plurality of subcarriers of the received signal;
    outputting correlation values for the subcarriers;
    computing a difference between a correlation value for each subcarrier and a correlation value for at least one adjacent subcarrier; and
    summing differences between the correlation values for the subcarriers and computing total interference and noise power.

14. The method according to claim 10, wherein the step of estimating the noise level comprises:

estimating a total noise level using power values of subcarriers among all subcarrier signals included in the received signal, and each of the subcarrier signals does not include a pilot signal.

15. The method according to claim 14, wherein the CINR is computed using:

$$CINR_d = \frac{C_p/10^{0.1B}}{I_p/10^{0.1B} + N_p} = \frac{C_p}{I_p + 10^{0.1B}/N_p} = \frac{C_p}{I_p + N_p + (10^{0.1B} - 1)N_p},$$

where $C_P$ denotes a received true signal power level in one of a preamble and a pilot signal interval, $I_P$ denotes a received interference level in the one of the preamble and the pilot signal interval, and $N_P$ denotes a noise level in the one of the preamble and the pilot signal interval.

16. The method according to claim 10, wherein the step of estimating the noise level comprises:

computing power values of subcarriers among all subcarrier signals, and each of the subcarrier signals does not include a pilot signal;

summing the computed power values; and computing a total subcarrier noise level using a result of the summation.

17. The method according to claim 10, wherein the step of computing the CINR comprises:

computing a true signal power by subtracting a value of the interference and noise power from a value of the total received signal power.

18. The method according to claim 10, wherein the step of estimating the CINR comprises estimating the CINR by taking into account a boosting level of one of a preamble signal and a pilot signal.

* * * * *

UNITED STATES PATENT AND TRADEMARK OFFICE
CERTIFICATE OF CORRECTION

PATENT NO. : 7,590,171 B2 Page 1 of 1
APPLICATION NO. : 11/260822
DATED : September 15, 2009
INVENTOR(S) : Chang et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 993 days.

Signed and Sealed this

Twenty-first Day of September, 2010

David J. Kappos
*Director of the United States Patent and Trademark Office*